United States Patent
Robinette et al.

(10) Patent No.: US 8,628,441 B2
(45) Date of Patent: Jan. 14, 2014

(54) TORQUE SPLITTING TORQUE CONVERTER ASSEMBLY

(75) Inventors: Darrell Lee Robinette, Brighton, MI (US); Victor M. Roses, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 275 days.

(21) Appl. No.: 13/185,338

(22) Filed: Jul. 18, 2011

(65) Prior Publication Data

US 2013/0020166 A1  Jan. 24, 2013

(51) Int. Cl.
*F16H 47/08* (2006.01)

(52) U.S. Cl.
USPC .......................................................... 475/47

(58) Field of Classification Search
USPC .......................................................... 475/47
See application file for complete search history.

(56) References Cited

U.S. PATENT DOCUMENTS

| | | | | |
|---|---|---|---|---|
| 2,301,451 A | * | 11/1942 | Pollard | 475/53 |
| 3,204,487 A | * | 9/1965 | Moore | 475/47 |
| 3,314,307 A | | 4/1967 | Egbert | |
| 4,117,745 A | * | 10/1978 | Yokoyama et al. | 475/53 |
| 4,398,436 A | * | 8/1983 | Fisher | 475/47 |
| 4,579,019 A | * | 4/1986 | Gabriele | 475/5 |
| 6,155,946 A | * | 12/2000 | Sudau | 475/53 |
| 7,785,229 B2 | | 8/2010 | Maddock | |

* cited by examiner

*Primary Examiner* — Sherry Estremsky

(57) ABSTRACT

A hydrodynamic torque converter assembly includes an internal planetary gear assembly that splits torque between a torque converter and a direct path to the transmission input as well as a damper and a torque converter clutch. The torque converter assembly includes an input shaft that is driven by the engine output shaft and is coupled to both the planetary gear carrier of the planetary gear assembly and the transmission hydraulic pump. The sun gear of the planetary gear assembly is coupled to the torque converter output shaft through a spring damper. The ring gear of the planetary gear assembly is coupled to one side of the torque converter clutch and the pump of the torque converter. The other side of the torque converter clutch is coupled to both the turbine of the torque converter and the spring damper. The stator of the torque converter is grounded. An alternate embodiment replaces the torque converter with a fluid coupling.

19 Claims, 2 Drawing Sheets

TORQUE SPLITTING TORQUE CONVERTER ASSEMBLY

FIELD

The present disclosure relates to torque converters for use with motor vehicle automatic transmissions and more particularly to a torque converter assembly having a torque splitting capability.

BACKGROUND

The statements in this section merely provide background information related to the present disclosure and may or may not constitute prior art.

Automatic transmissions utilized in modern motor vehicles typically incorporate a device commonly referred to as a hydrodynamic torque converter or simply a torque converter. The torque converter automatically disengages the rotating engine output shaft from the transmission input shaft during vehicle idle conditions to enable the vehicle to stop without stalling the engine. The torque converter also functions as a torque multiplier which increases engine torque delivered to the transmission in the lower speed range until torque converter output speed approximately matches the input (engine) speed.

Because all of the powertrain energy from the engine traverses the torque converter, its performance is critical to the overall performance of the powertrain and vehicle. Such factors as acceleration, shift points, shift smoothness and fuel economy are all affected by and partially determined by the operating parameters of the torque converter. One of the measures of torque converter performance is the "K-factor." The K-factor is the ratio of the input speed of the torque converter to the square root of the torque output of the engine, as measured at any torque converter operating point. In turn, the "operating point" of a torque converter is typically defined by the ratio of the output speed to the input speed which is also known as the speed ratio.

All things being equal, it is desirable to achieve a low K-factor across the entire speed ratio range. Increased efficiency of energy transfer through a torque converter is also a highly desirable goal. The present invention is directed to a torque converter which achieves both goals.

SUMMARY

The present invention provides a hydrodynamic torque converter assembly having an internal planetary gear assembly that splits torque between a torque converter and a direct path to the transmission input as well as a damper and a torque converter clutch. The torque converter assembly includes an input shaft that is driven by the engine output shaft and coupled to both the planetary gear carrier of the planetary gear assembly and the hydraulic pump of the transmission. The sun gear of the planetary gear assembly is coupled to the torque converter output shaft through a spring damper. The ring gear of the planetary gear assembly is coupled to one side of the torque converter clutch and the pump of the torque converter. The torque converter clutch may be either a friction clutch pack (with multiple interleaved discs or plates) or a face clutch. The other side of the torque converter clutch is coupled to both the turbine of the torque converter and to the spring damper. The stator of the torque converter is grounded to, for example, the housing of the transmission. The torque converter assembly of the present invention provides increased coupling point efficiency, a reduced K-factor across the entire speed ratio range and the potential for improved torque converter clutch slip control at speed ratios greater than 0.90 due to the reduced K-factor.

In an alternate embodiment of the torque converter assembly, the torque converter is replaced by a fluid coupling and, again, the torque converter clutch may be either a friction clutch pack or a face clutch.

Thus it is an aspect of the present invention to provide a torque converter assembly having a reduced K-factor.

It is a further aspect of the present invention to provide a torque converter assembly having an internal planetary gear assembly.

It is a still further aspect of the present invention to provide a torque converter assembly that splits torque between the torque converter and a direct path to the transmission input.

It is a still further aspect of the present invention to provide a torque converter assembly having a torque converter clutch.

It is a still further aspect of the present invention to provide a torque converter assembly having either a friction clutch pack or a face clutch.

It is a still further aspect of the present invention to provide a torque converter assembly that includes an input shaft that is driven by an engine output shaft and coupled to the planetary gear carrier of the planetary gear assembly and a transmission hydraulic pump.

It is a still further aspect of the present invention to provide a torque converter assembly wherein the sun gear of the planetary gear assembly is coupled to the torque converter output shaft through a spring damper.

It is a still further aspect of the present invention to provide a torque converter assembly wherein the ring gear of the planetary gear assembly is coupled to one side of a torque converter clutch and the pump of the torque converter.

It is a still further aspect of the present invention to provide a torque converter assembly wherein one side of a torque converter clutch is coupled to both the turbine of the torque converter and to the spring damper.

It is a still further aspect of the present invention to provide a torque converter assembly wherein the stator of the torque converter is grounded.

It is a still further aspect of the present invention to provide a torque converter assembly having a fluid coupling.

Further aspect, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
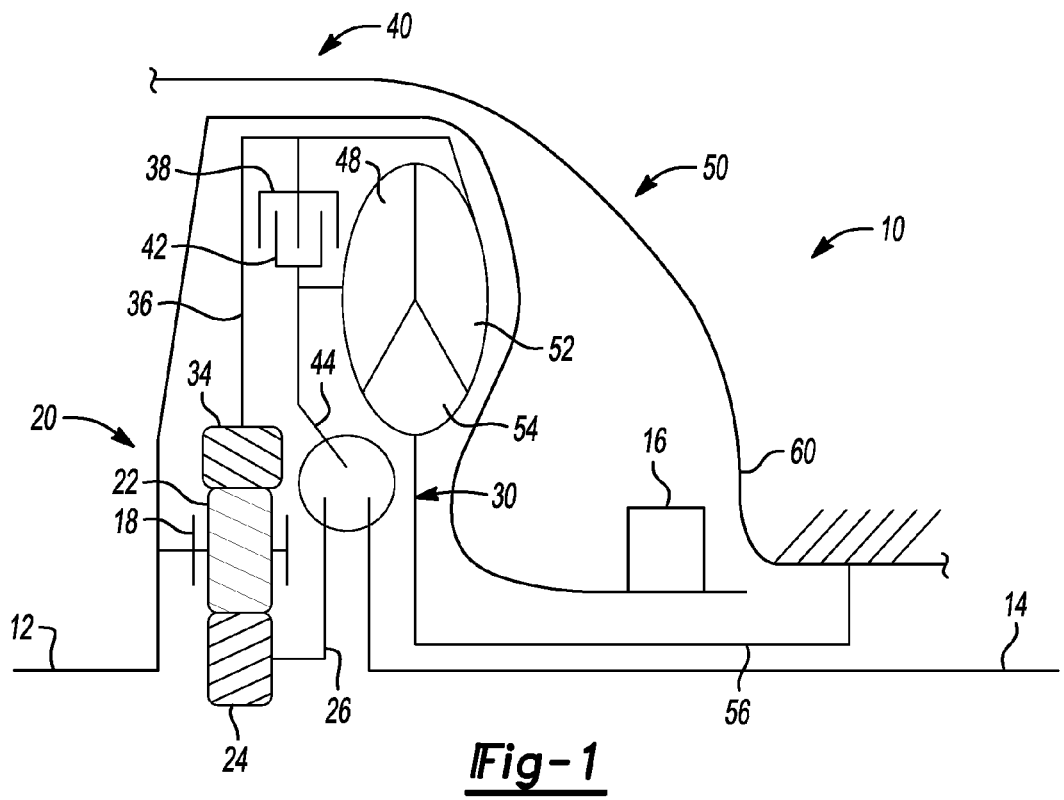
FIG. 1 is a schematic diagram of a torque converter assembly according to the present invention.

With reference to FIG. 1, a torque converter assembly according to the present invention is illustrated and generally designated by the reference number 10. The torque converter assembly 10 includes an input shaft or member 12 which is coupled to and driven by the output shaft or crankshaft (not illustrated) of a prime mover such as a gasoline, flex fuel or Diesel engine (also not illustrated) and a coaxial output shaft or member 14 which is coupled to and drives an automatic transmission (also not illustrated).

The input shaft or member 12 is coupled to and drives both a hydraulic pump 16 which provides a pressurized flow of hydraulic fluid (transmission oil) to the transmission when the prime mover is rotating and a planet gear carrier 18 which is a portion of a simple planetary gear assembly 20. The planet gear carrier 18 freely rotatably supports a plurality, preferably three, planet or pinion gears 22, one of which is illustrated in FIG. 1. The planetary gear assembly 20 also includes a sun gear 24 which is in constant mesh with the planet or pinion gears 22 and which is coupled to and drives a shaft or output member 26 which, in turn, is connected to a spring damper assembly 30. The spring damper assembly 30 is conventional and includes energy absorbing elements such as compression springs that temporarily absorb energy transients and smooth operation of the torque converter assembly 10.

The planetary gear assembly 20 further includes a ring gear 34 which is in constant mesh with the planet or pinion gears 22. The ring gear 34 is coupled to and drives a shaft or member 36 which, in turn, is coupled to and drives a first clutch face or plurality of clutch discs 38 which are a portion of a friction clutch assembly 40. The first clutch face of plurality of clutch discs 38 are disposed in an engageable and torque transferring relationship with a second clutch face or plurality of discs 42. The second clutch face or plurality of discs 42 are coupled to a shaft or member 44 which, in turn, is coupled to both the spring damper assembly 30 and a turbine 48 of a torque converter 50. The shaft or member 36 is also coupled to and drives a pump 52 of the torque converter 50. A stator 54 of the torque converter 50 is connected through a shaft or member 56 to a stationary housing or ground 60. The stationary housing 60 is typically a cast metal bell which mounts, locates, supports and protects the various components of the torque converter assembly 10 between the engine and transmission.

Figure 2:
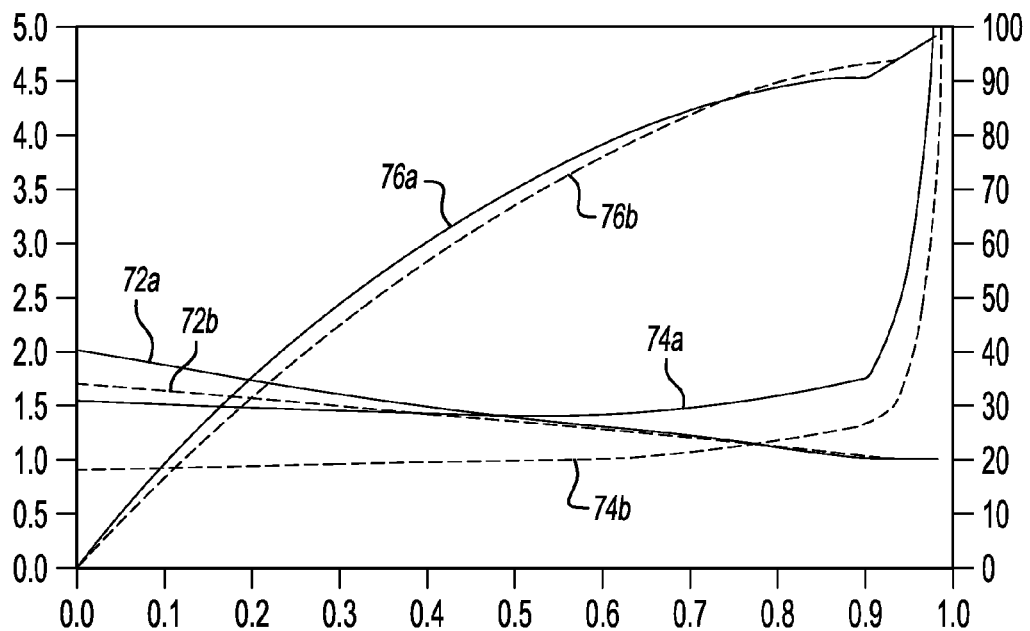
FIG. 2 is a graph having several plots which present and contrast the performance of a conventional torque converter with that of a torque converter assembly according to the present invention.

Referring now to FIGS. 1 and 2, the operation of the torque converter assembly 10 of the present invention will be described. The graph of FIG. 2 is scaled horizontally (along the X-axis) and presents the speed ratio, that is, the ratio of input speed to output speed from 0.0 to 1.0 (unity). The left side of the graph is scaled vertically (along the Y-axis) and presents the K-factor divided by 100 and the torque ratio (TR), both quantities sharing the scale from 0.0 to 5.0. The K-factor, as noted above, is the input speed divided by the square root of the engine torque at any operating point, for example, at a given speed ratio. The torque ratio is the output torque divided by the input torque. The right side of the graph is scaled vertically (along the Y-axis) and presents the operating efficiency of the torque converter from 0% to 100%. The solid lines, in all cases, represent the performance of a standard or conventional torque converter and the dashed lines, in all cases, represent the performance of the torque converter assembly 10 of the present invention.

The lines 72A and 72B present operating values of the torque ratio (TR). Note that the line 72B for a torque converter assembly 10 according to the present invention is essentially always lower than the line 72A relating to a conventional torque converter. The lines 74A and 74B present operating values of the K-factor. Note that the line 74B for a torque converter assembly 10 according to the present invention is always lower than the line 74A relating to a conventional torque converter. The lines 76A and 76B present operating values of efficiency. Note that while the torque converter 10 according to the present invention represented by the line 76B is slightly less efficient at lower speed ratios, it is more efficient than a conventional torque converter represented by the line 76A at higher speed ratios.

Thus is will be appreciated that a torque converter assembly 10 according to the present invention provides a split torque path through the launch device wherein a percentage of the prime mover torque is transferred through the torque converter 50 and the balance of prime mover torque is transferred through the sun gear 24 of the planetary gear assembly 20. The torque converter 50 nonetheless performs the function of regulating the speed of the prime mover when the torque converter clutch 40 is not fully applied with zero slip. At higher speeds, the torque converter clutch is engaged to bypass the torque converter 50 in accordance with conventional, current practice.

The torque converter assembly 10 of the present invention has broad application in automatic transmissions that presently utilize a conventional torque converter configuration and are calibrated to have an aggressive torque converter slip schedule to reduce fuel consumption. For conventional torque converter configurations with small diameters or which are axially squashed, high K-factor ratings can compromise torque converter clutch slip control and provide objectionable drivability (e.g., a high amount of engine speed flare during pedal tip-in events). The torque converter assembly 10 of the present invention lowers K-factors across the entire speed ratio range, as illustrated in FIG. 2, and increases efficiency at and above the coupling point (with reduced heat rejection) but lowers the stall torque ratio. The lower K-factor rating results in a "tighter" torque converter, meaning less engine speed flare during pedal tip-in events and improved torque converter slip control.

Figure 3:
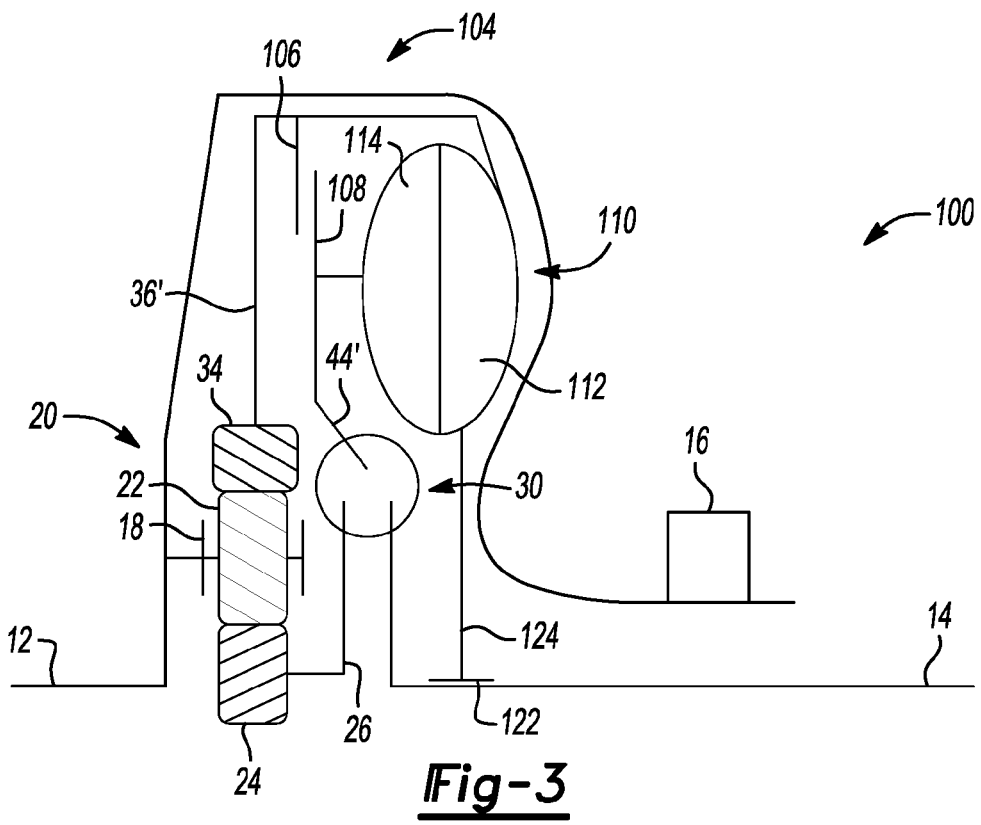
FIG. 3 is a schematic diagram of a portion of an alternate embodiment of a torque converter assembly according to the present invention.

Referring now to FIGS. 1 and 3, an alternate embodiment torque converter assembly is illustrated and generally designated by the reference number 100. The alternate embodiment torque converter assembly 100 is very similar to the torque converter assembly 10 except that the friction clutch assembly 40 which includes a first plurality of clutch discs 38 and a interleaved, second clutch plurality of discs 42 is replaced with a face clutch 104 having an input disc or plate 106 and an output disc or plate 108. Additionally, the torque converter 50 is replaced with a fluid coupling 110 including a pump (input member) 112 and a turbine (output member) 118. The pump 112 is coupled to the input disc or plate 106 of the face clutch 104 and the ring gear 34 of the planetary gear assembly 20 through a shaft or member 36'. The turbine 118 is coupled to the output disc or plate 108 of the face clutch 104 and the spring damper assembly 30 by a shaft or member 44'. The fluid coupling 110 may be supported concentrically about the torque converter output shaft or member 14 on a suitable bearing 122 and a circular disc or member 124.

Figure 4:
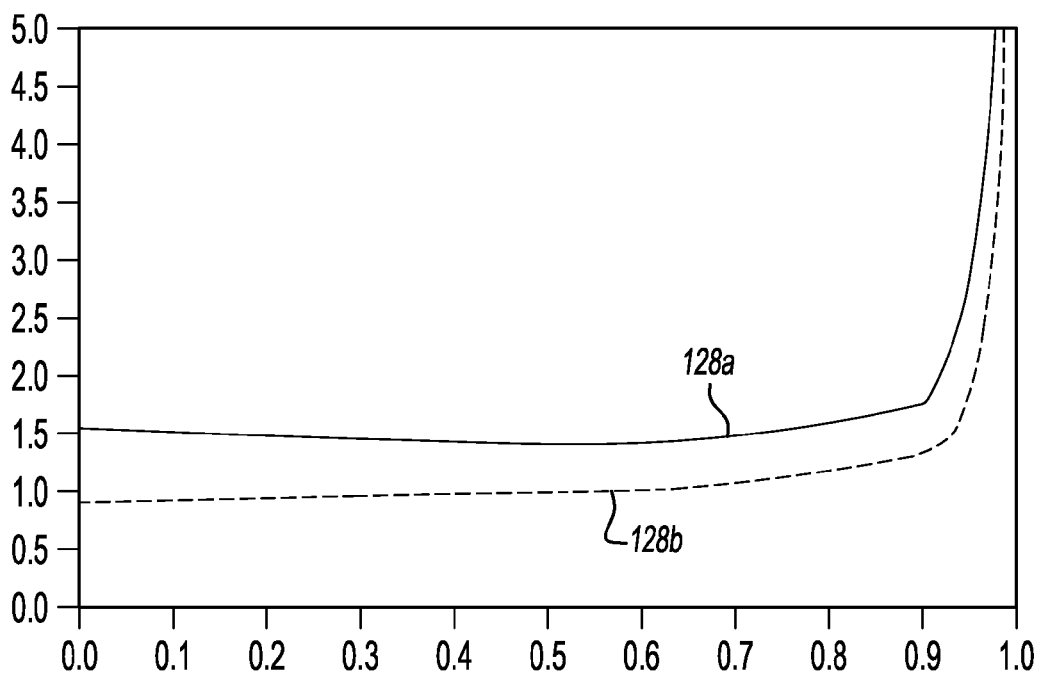
FIG. 4 is a graph having two plots which present and contrast the performance of a conventional torque converter with that of the alternate embodiment of a torque converter assembly according to the present invention.

FIG. 4, like FIG. 2, is scaled horizontally (along the X-axis) and presents the speed ratio, that is, the ratio of input speed to output speed from 0.0 to 1.0 (unity). The left side of the graph is scaled vertically (along the Y-axis) and presents the K-factor divided by 100 from 0.0 to 5.0. The K-factor, as noted above, is the input speed divided by the square root of the engine torque at any operating point, for example, at a given speed ratio. The upper, solid line 128A presents the K-factor of a conventional torque converter and the lower, dashed line 128B presents the K-factor of the torque converter assembly 100.

Although described above in a first embodiment torque converter assembly 10 with a friction clutch pack 40 and three element torque converter 50 and in an alternate embodiment torque assembly 100 with a face clutch 104 and fluid coupling 110, it should be appreciated that the components may be interchanged among the two embodiments, for example, the friction clutch pack 40 may be incorporated into the alternate embodiment assembly 100 and the fluid coupling 110 may be incorporated into the first embodiment assembly 10.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque converter assembly comprising, in combination,
    an input member,
    an output member,
    a planetary gear assembly having a sun gear, a planet gear carrier coupled to said input member and rotatably supporting a plurality of planet gears and a ring gear, said planet gears in constant mesh with said sun gear and said ring gear,
    a spring damper having an input coupled to said sun gear and an output coupled to said output member,
    a fluid coupling having at least a pump and a turbine, and
    a friction clutch having a first side coupled to said ring gear and said pump of said fluid coupling and a second side coupled to said turbine of said fluid coupling and another input of said spring damper.

2. The torque converter assembly of claim 1 further including a housing and a stator coupled to said housing.

3. The torque converter assembly of claim 1 further including a hydraulic pump coupled to and driven by said input member.

4. The torque converter assembly of claim 1 wherein said input member and said output member are shafts.

5. The torque converter assembly of claim 1 wherein said input member and said output member are co-axial.

6. The torque converter assembly of claim 1 wherein said first side of said friction clutch includes a first plurality of discs interleaved with a second plurality of discs on said second side.

7. The torque converter assembly of claim 1 wherein said fluid coupling is a torque converter including a stator.

8. A torque converter assembly comprising, in combination,
    an input shaft,
    an output shaft,
    a planetary gear assembly having a sun gear, a planet gear carrier coupled to said input shaft and rotatably supporting a plurality of planet gears and a ring gear, said planet gears in constant mesh with said sun gear and said ring gear,
    a spring damper having a first member coupled to said sun gear and a second member coupled to said output shaft,
    a hydrodynamic torque converter having a pump and a turbine, and
    a friction clutch having a input side coupled to said ring gear and said pump of said torque converter and a output side coupled to said turbine of said torque converter and a third member of said spring damper.

9. The torque converter assembly of claim 8 further including a housing and stator in said torque converter and wherein said stator is coupled to said housing.

10. The torque converter assembly of claim 8 further including a hydraulic pump coupled to and driven by said input shaft.

11. The torque converter assembly of claim 8 wherein said input shaft and said output shaft are co-axial.

12. The torque converter assembly of claim 8 wherein said input side of said friction clutch includes a first plurality of discs interleaved with a second plurality of discs on said output side.

13. The torque converter of claim 8 wherein said input side of said friction clutch includes a first disc adjacent a second disc on said output side.

14. A hydrodynamic torque converter assembly comprising, in combination,
    an input shaft,
    an output shaft disposed co-axially with said input shaft,
    a simple planetary gear assembly having a sun gear, a planet gear carrier coupled to said input shaft and rotatably supporting a plurality of planet gears and a ring gear, said planet gears in constant mesh with said sun gear and said ring gear,
    a spring damper having an input coupled to said sun gear and an output coupled to said output shaft,
    a hydrodynamic torque converter having a pump, a turbine and a stator, and
    a friction clutch having a input side coupled to said ring gear and said pump of said torque converter and a output side coupled to said turbine of said torque converter and another input of said spring damper.

15. The hydrodynamic torque converter assembly of claim 14 further including a housing and wherein said stator of said torque converter is coupled to said housing.

16. The hydrodynamic torque converter assembly of claim 14 further including a hydraulic pump coupled to and driven by said input shaft.

17. The hydrodynamic torque converter assembly of claim 14 wherein said input side of said friction clutch includes a first plurality of discs interleaved with a second plurality of discs on said output side.

18. The hydrodynamic torque converter assembly of claim 14 wherein said input side of said friction clutch defines a first plate adjacent a second plate defining said output side.

19. The hydrodynamic torque converter assembly of claim 14 wherein said plurality of planet gears includes three planet gears.

* * * * *